(12) United States Patent
Lee

(10) Patent No.: US 12,122,380 B2
(45) Date of Patent: Oct. 22, 2024

(54) APPARATUS, METHOD AND COMPUTER READABLE STORAGE MEDIUM FOR PREVENTING ROLLING OF VEHICLE OPERATING IN AUTO VEHICLE HOLD MODE

(71) Applicants: HYUNDAI MOTOR COMPANY, Seoul (KR); KIA CORPORATION, Seoul (KR)

(72) Inventor: Don Kee Lee, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 308 days.

(21) Appl. No.: 17/704,829

(22) Filed: Mar. 25, 2022

(65) Prior Publication Data

US 2023/0150503 A1    May 18, 2023

(30) Foreign Application Priority Data

Nov. 18, 2021 (KR) .................. 10-2021-0159247

(51) Int. Cl.
*B60W 30/18* (2012.01)
*B60W 50/08* (2020.01)
*B60W 50/10* (2012.01)

(52) U.S. Cl.
CPC .... *B60W 30/18109* (2013.01); *B60W 50/082* (2013.01); *B60W 50/10* (2013.01);
(Continued)

(58) Field of Classification Search
CPC ......... B60W 30/18109; B60W 50/082; B60W 50/10; B60W 2510/10; B60W 2510/182;
(Continued)

(56) References Cited

U.S. PATENT DOCUMENTS

2004/0226768 A1* 11/2004 DeLuca ............... B60T 17/221
                                                    180/275
2010/0327960 A1* 12/2010 Huber ............... H03K 19/0016
                                                    327/538
(Continued)

FOREIGN PATENT DOCUMENTS

CN    107200007 A  *  9/2017  ........... B60W 10/06
CN    107630757 A  *  1/2018  ........... F02D 41/042
(Continued)

*Primary Examiner* — B M M Hannan
(74) *Attorney, Agent, or Firm* — MORGAN, LEWIS & BOCKIUS LLP

(57) ABSTRACT

An apparatus for preventing rolling of a vehicle operating in an automatic vehicle hold mode includes a reset determination unit configured to determine whether an automatic hold controller controlling an operation of the automatic vehicle hold mode has been reset, a mode determination unit configured to determine whether a mode of the vehicle is the automatic vehicle hold mode when it is determined that the automatic hold controller has been reset, and a vehicle control unit configured to brake the vehicle, based on at least one of a gear position, an opening degree of an accelerator pedal, and whether a brake pedal is operated, when it is determined that the mode of the vehicle is the automatic vehicle hold mode.

11 Claims, 4 Drawing Sheets

(52) U.S. Cl.
CPC ... *B60W 2510/10* (2013.01); *B60W 2510/182* (2013.01); *B60W 2510/188* (2013.01)

(58) Field of Classification Search
CPC ..... B60W 2510/188; B60W 30/18018; B60W 2540/10; B60W 2540/12; B60W 2540/16; B60W 2710/186; B60W 30/18118; B60W 10/18; B60T 7/04; B60T 7/12; B60T 2201/06
USPC .......................................................... 701/70
See application file for complete search history.

(56) References Cited

U.S. PATENT DOCUMENTS

| | | | | |
|---|---|---|---|---|
| 2016/0001781 | A1* | 1/2016 | Fung | G07C 9/37 |
| | | | | 701/36 |
| 2017/0043767 | A1* | 2/2017 | Khafagy | B60W 30/16 |
| 2017/0267243 | A1* | 9/2017 | Chang | B60W 10/06 |
| 2018/0022345 | A1* | 1/2018 | Seo | B62D 15/027 |
| | | | | 701/2 |
| 2018/0037260 | A1* | 2/2018 | Otake | G05D 1/0055 |
| 2018/0065602 | A1* | 3/2018 | Chung | B60T 13/662 |
| 2019/0163322 | A1* | 5/2019 | Lee | G06F 3/0412 |
| 2019/0242320 | A1* | 8/2019 | Aoki | F02N 11/0833 |
| 2019/0249623 | A1* | 8/2019 | Kugo | F02D 41/004 |
| 2019/0382009 | A1* | 12/2019 | Iwasa | G08G 1/0969 |
| 2020/0348669 | A1* | 11/2020 | Kim | B60W 60/00184 |
| 2020/0379679 | A1* | 12/2020 | Oh | G06F 3/0604 |
| 2021/0107507 | A1* | 4/2021 | Matsunaga | B60W 50/14 |
| 2021/0179087 | A1* | 6/2021 | Tsujino | G08G 1/168 |
| 2021/0179088 | A1* | 6/2021 | Nakada | B62D 15/0285 |
| 2021/0245754 | A1* | 8/2021 | Valero | B60W 10/06 |
| 2022/0080971 | A1* | 3/2022 | Bolger | B60W 30/182 |
| 2022/0185262 | A1* | 6/2022 | Sato | F02N 11/0862 |
| 2024/0026647 | A1* | 1/2024 | Ikeda | B60T 13/22 |

FOREIGN PATENT DOCUMENTS

| | | | | |
|---|---|---|---|---|
| CN | 111348044 | A * | 6/2020 | ............. B60T 1/005 |
| CN | 111873981 | A * | 11/2020 | ........... B60G 17/015 |
| CN | 110562220 | B * | 12/2020 | |
| CN | 112109560 | A * | 12/2020 | ........... B60L 15/2009 |
| CN | 112977429 | A * | 6/2021 | ............ B60T 17/221 |
| CN | 112977430 | A * | 6/2021 | .............. B60T 17/00 |
| CN | 107640148 | B * | 8/2021 | .............. B60R 25/10 |
| CN | 109421713 | B * | 9/2021 | ............ B60W 30/09 |
| CN | 113561796 | A * | 10/2021 | |
| CN | 113561979 | A * | 10/2021 | |
| CN | 113954814 | A * | 1/2022 | |
| DE | 102015220058 | A1 * | 5/2016 | ............ B60T 13/662 |
| DE | 102021123565 | A1 * | 3/2022 | ............ B60W 10/08 |
| JP | 6454884 | B2 | 1/2019 | |
| JP | 2019196117 | A * | 11/2019 | ............ B60W 30/06 |
| JP | 2022127814 | A * | 9/2022 | ............... B60T 7/12 |
| KR | 102303223 | B1 * | 7/2016 | |
| KR | 101723391 | B1 * | 4/2017 | |
| KR | 20180026913 | A * | 3/2018 | |
| KR | 10-2018-0056836 | A | 5/2018 | |
| KR | 102383249 | B1 * | 6/2019 | |

* cited by examiner

APPARATUS, METHOD AND COMPUTER READABLE STORAGE MEDIUM FOR PREVENTING ROLLING OF VEHICLE OPERATING IN AUTO VEHICLE HOLD MODE

CROSS-REFERENCE TO RELATED APPLICATION

This application claims the benefit under 35 USC 119 (a) of Korean Patent Application No. 10-2021-0159247 filed on Nov. 18, 2021 in the Korean Intellectual Property Office, the entire disclosure of which is incorporated herein by reference for all purposes.

TECHNICAL FIELD

The present disclosure relates to an apparatus, method and computer-readable storage medium for preventing rolling of vehicles operating in an automatic vehicle hold mode.

BACKGROUND

The Automatic Vehicle Hold (AVH) mode is a mode in which after pressing the brake pedal while driving, even when taking the foot off the brake pedal after the vehicle is stopped, the vehicle's stopped state is maintained by maintaining the operating hydraulic pressure of the brake. A separate controller is provided for such an automatic vehicle hold mode.

However, in the case in which a voltage drop occurs in the power supply to the controller during the automatic vehicle hold mode, the controller has been reset, thereby canceling the automatic vehicle hold mode.

Therefore, in the case in which the driver takes his foot off the brake pedal without recognizing that the automatic vehicle hold mode is released, there is a risk that the vehicle may roll on a slope or collide with another vehicle due to creep driving.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide an apparatus, method, and computer-readable storage medium for preventing a vehicle from rolling in an automatic vehicle hold mode, to prevent a collision with another vehicle.

According to an aspect of the present disclosure, an apparatus for preventing rolling of a vehicle operating in an automatic vehicle hold mode includes a reset determination unit configured to determine whether an automatic hold controller controlling an operation of the automatic vehicle hold mode has been reset; a mode determination unit configured to determine whether a mode of the vehicle is the automatic vehicle hold mode when it is determined that the automatic hold controller has been reset; and a vehicle control unit configured to brake the vehicle, based on at least one of a gear position, an opening degree of an accelerator pedal, and whether a brake pedal is operated, when it is determined that the mode of the vehicle is the automatic vehicle hold mode.

According to an aspect of the present disclosure, a method of preventing rolling of a vehicle operating in an automatic vehicle hold mode includes a first operation of determining, in a reset determination unit, whether an automatic hold controller controlling an operation of the automatic vehicle hold mode has been reset; a second operation of determining whether a mode of the vehicle is the automatic vehicle hold mode when it is determined that the automatic hold controller has been reset, by a mode determination unit; and a third operation of braking the vehicle based on at least one of a gear position, an opening degree of an accelerator pedal, and whether or not a brake pedal is operated, when it is determined that the mode of the vehicle is the automatic vehicle hold mode, by a vehicle control unit.

According to an aspect of the present disclosure, a computer-readable storage medium in which a program for executing the method described above is recorded on a computer is provided. The computer-readable storage medium store a program which causes a computer to perform a first operation of determining whether an automatic hold controller controlling an operation of the automatic vehicle hold mode has been reset; a second operation of determining whether a mode of the vehicle is the automatic vehicle hold mode when it is determined that the automatic hold controller has been reset; and a third operation of braking the vehicle based on at least one of a gear position, an opening degree of an accelerator pedal, and whether or not a brake pedal is operated, when it is determined that the mode of the vehicle is the automatic vehicle hold mode.

BRIEF DESCRIPTION OF DRAWINGS

The above and other aspects, features, and advantages of the presently disclosed concept will be more clearly understood from the following detailed description, taken in conjunction with the accompanying drawings, in which.

DETAILED DESCRIPTION

Figure 1:
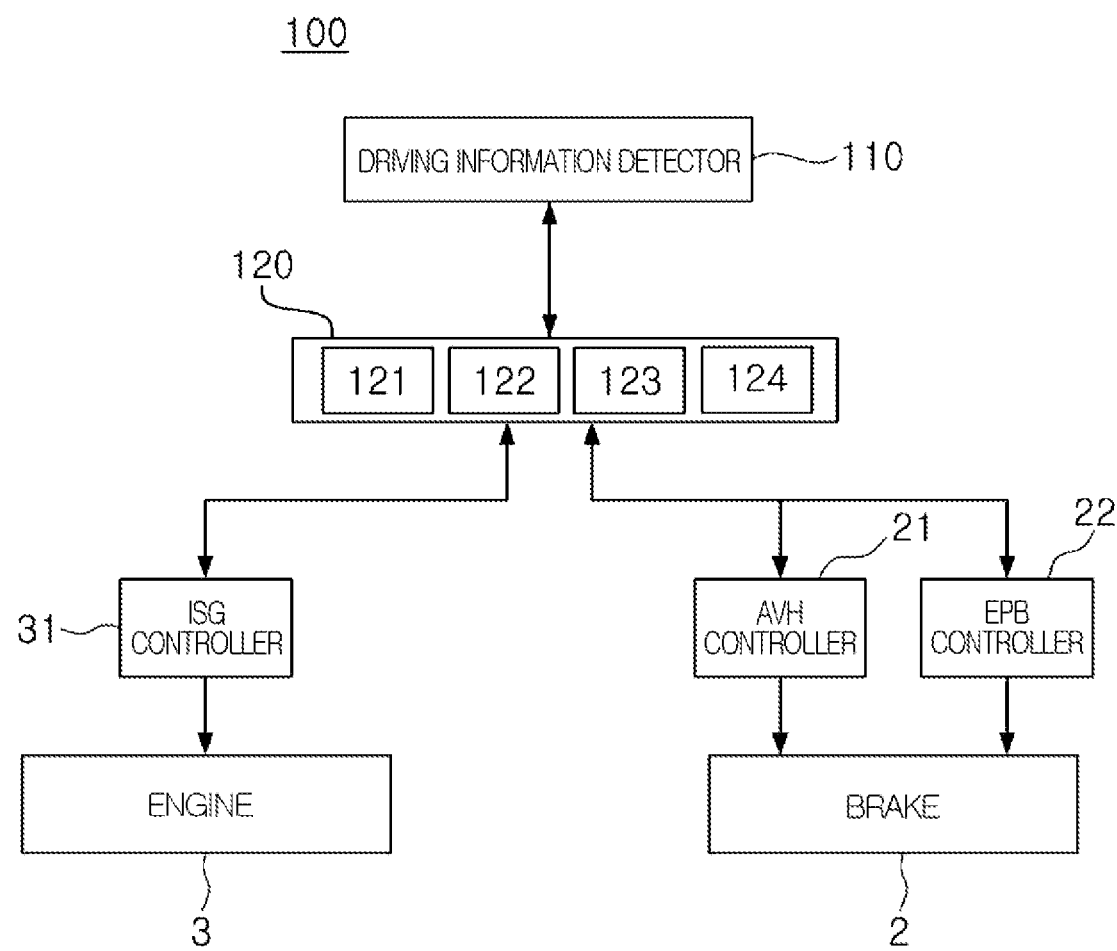
FIG. 1 is a block diagram of an entire system including an apparatus for preventing rolling of a vehicle according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

FIG. 1 is a configuration diagram of an entire system 100 including an apparatus 120 for preventing rolling of a vehicle 120 according to an embodiment.

As illustrated in FIG. 1, a brake 2 may be controlled by an Automatic Vehicle Hold (AVH) controller 21 and an Electronic Parking Brake (EPB) controller 22.

The AVH controller 21 may control the brake 2 to operate in the automatic hold (AVH) mode according to the control of the apparatus 120 for preventing rolling of a vehicle.

The above-described Automatic Vehicle Hold (AVH) mode is an additional function of Electronic Stability Control (ESC) constituting a brake system, and is the mode in which after pressing the brake pedal while driving, even when taking the foot off the brake pedal after the vehicle is stopped, the vehicle's stopped state is maintained by maintaining the operating hydraulic pressure of the brake 2. According to the AVH mode, in particular, on a slope, a function of preventing the vehicle from rolling may be implemented when the vehicle is started by pressing the accelerator pedal after stopping.

In addition, the above-described EPB controller 22 may control the brake 2 to operate in an Electronic Parking Brake (EPB) mode according to the control of the apparatus 120 for preventing rolling of a vehicle.

The above-described electronic parking brake (EPB) mode is also an additional function of the Electronic Stability Control (ESC) constituting the brake system, and is the mode for continuously maintaining a stopped state of the vehicle by generating operating hydraulic pressure of the brake using a motor.

On the other hand, an engine 3 may be controlled by an Idle Stop and Go (ISG) controller 31.

The ISG controller 31 may control the engine 3 to operate in the ISG mode according to the control of the apparatus 120 for preventing rolling of a vehicle.

The above-described idle stop and go (ISG) mode automatically turns off the engine when the driver presses the brake pedal in the idle state of the engine 3 (Idle Stop), and thereafter, in this mode, in the case in which there is a request for a restart by the driver (e.g. by pressing the accelerator pedal), the engine 3 is restarted (Go) to enable normal driving. According to this ISG mode, idling of the engine 3 may be prevented and fuel efficiency improvement effect may be obtained.

On the other hand, a driving information detector 110 may detect the state of a vehicle V and transmit the detected information to the apparatus 120 for preventing rolling of the vehicle.

To this end, the driving information detector 110 may include a shift position sensor detecting gear positions such as P, D, and R gears, an accelerator pedal sensor detecting an opening degree of the accelerator pedal, and a brake pedal sensor detecting an opening degree of the brake pedal, and may receive the input of a mode set by the driver, for example, an AVH mode or an ISG mode. The detected vehicle state or input mode may be transmitted to the apparatus 120 for preventing rolling of a vehicle.

On the other hand, the apparatus 120 for preventing rolling of a vehicle may include a reset determination unit 121, a mode determination unit 122, and a vehicle control unit 123.

In detail, the reset determination unit 121 may determine whether the AVH controller 21 that controls the AVH mode operation is reset. To this end, the reset determination unit 121 may monitor the voltage level of the power supplied to the AVH controller 21. For example, when the voltage drop of the power supplied to the AVH controller 21 occurs, the reset determination unit 121 may determine that the AVH controller 21 has been reset. The AVH mode set by the driver may be canceled by reset.

The voltage drop of the power supplied to the AVH controller 21 may be caused by various causes, and may be mainly caused by the engine 3. For example, a relatively large current is required when the engine 3 is started, and a voltage drop of the power supplied to the AVH controller 21 may occur due to this large current.

In detail, recently, vehicles capable of the ISG mode have appeared in order to prevent the engine 3 from idling and to improve fuel efficiency. According to the ISG mode, since the engine is started according to the driver's request for restart (e.g., by pressing the accelerator pedal), a voltage drop of the power supplied to the AVH controller 21 may occur at this time.

On the other hand, when it is determined that the AVH controller 21 has been reset, the mode determination unit 122 may determine whether the vehicle mode is the automatic vehicle hold mode.

To this end, the apparatus for preventing rolling of a vehicle 120 may further include a memory 124 that stores a mode state indicating that the vehicle mode is the AVH mode. Accordingly, when it is determined that the AVH controller 21 has been reset, the mode determination unit 122 may determine whether the vehicle mode is the AVH mode with reference to the memory 124. The above-described mode state is represented by 1 bit as on ('1') or off ('0'), and the mode state may be recorded and stored in the memory 124 by the AVH controller 21.

On the other hand, when it is determined that the mode of the vehicle is the AVH mode, the vehicle control unit 123 may brake the vehicle based on at least one of a gear position, an opening degree of an accelerator pedal, and whether a brake pedal is operated.

In detail, in the case in which the gear position is not at the P stage, the opening degree of the accelerator pedal is less than a reference opening degree and the brake pedal is operated, and when the operating hydraulic pressure according to the opening degree of the brake pedal is higher than a preset operating hydraulic pressure, the vehicle control unit 123 may control the AVH controller 21 to re-enter the AVH mode, thereby braking the vehicle.

The preset operating hydraulic pressure according to the reference opening degree of the accelerator pedal or the opening degree of the brake pedal may be appropriately set according to the needs of those skilled in the art, and the present disclosure is not limited to specific numerical values.

On the other hand, when the gear position is not at the P stage, the opening degree of the accelerator pedal is less than the reference opening amount, and the brake pedal does not operate, the vehicle control unit 123 may control the FPB controller 22 to brake the vehicle in the EPB mode.

In the case in which the gear position is at the P-stage, since the vehicle may be stopped by the transmission, there is no room for the present disclosure to be applied, and therefore, the AVH mode may be switched to the standby state.

On the other hand, when the gear position is not at the P stage, since the vehicle is in a state capable of driving, it is necessary to brake the vehicle according to the embodiment as described above.

Also, when the accelerator pedal opening amount is equal to or greater than the reference opening amount, the driver has a will to drive, and therefore, there is no need to brake the vehicle. Accordingly, according to an embodiment, the vehicle is braked as described above only when the opening amount of the accelerator pedal is less than the reference opening amount.

In addition, when the operating hydraulic pressure according to the opening degree of the brake pedal is greater than the preset operating hydraulic pressure, it is possible to maintain braking with the operating hydraulic pressure according to the opening amount of the brake pedal. Therefore, the vehicle may be braked by controlling the AVH controller 21 to re-enter the AVH mode.

On the other hand, when the operating hydraulic pressure according to the opening degree of the brake pedal is equal to or less than the preset operating hydraulic pressure, it is not sufficient to maintain braking with the operating hydraulic pressure according to the opening amount of the brake pedal, and thus, the EPB controller 22 may be controlled to brake the vehicle.

Figure 2A:
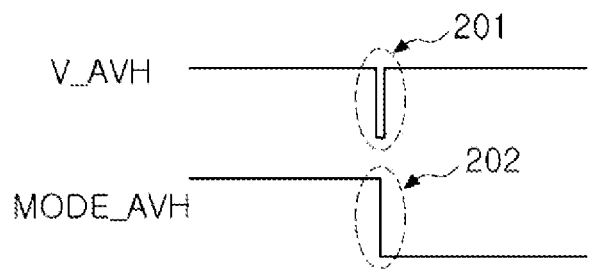
FIGS. 2A to 2C are drawings illustrating a voltage drop of voltage supplied to an AVH controller and comparison of operations of an automatic vehicle hold mode and an electronic parking brake mode accordingly.
Figure 2B:
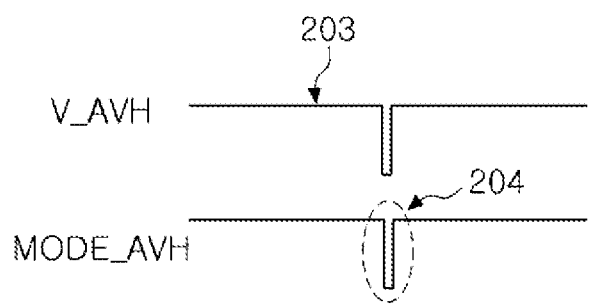
Figure 2C:
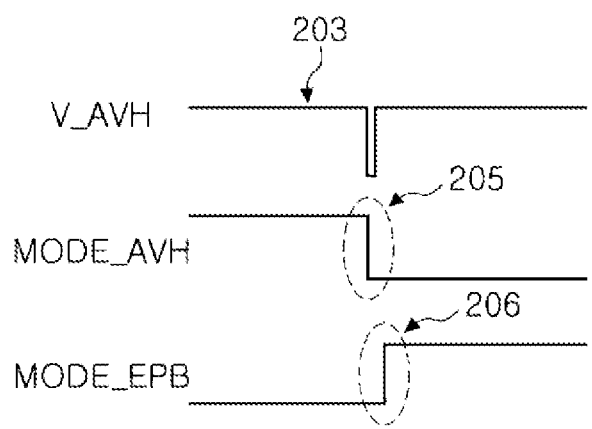

FIGS. 2A to 2C are diagrams illustrating the voltage drop of the voltage supplied to the AVH controller and comparison of operations of the AVH mode and the EPB mode accordingly.

As illustrated in FIG. 2A, in the related art, when a voltage drop of a voltage V_AVH supplied to the AVH controller 21 occurs (201), an AVH mode (MODE_AVH) is released (202) due to the reset of the AVH controller 21, which causes a risk of slipping on a ramp or colliding with another vehicle due to creep driving.

On the other hand, as illustrated in FIG. 2B, according to an embodiment of the present disclosure, at a time point 203 when the voltage V_AVH supplied to the AVH controller 21 is stable, a mode state indicating the AVH mode (MODE_AVH) may be written to the memory 124, and in the case in which a voltage drop occurs, the AVH controller 21 is controlled after referring to the mode state stored in the memory 124, to re-enter the AVH mode (MODE_AVH), to brake the vehicle (204).

FIG. 2B described above may be applied to the case in which the gear position is not at the P stage, the opening degree of the accelerator pedal is less than the reference opening degree, and the brake pedal is operated, and to the case in which the operating hydraulic pressure according to the opening degree of the brake pedal is higher than the preset operating hydraulic pressure.

On the other hand, as illustrated in FIG. 2C, according to an embodiment of the present disclosure, a mode state indicating the AVH mode (MODE_AVH) may be written to and stored in the memory 124 at a time point 203 when the voltage V_AVH supplied to the AVH controller 21 is stable, and when a voltage drop occurs, the EPB controller 22 may be controlled according to the mode state stored in the memory 124 to brake the vehicle (206). In this case, the AVH mode (MODE_AVH) is released (205).

FIG. 2C described above may be applied to a case in which the gear position is not at the P stage, the opening degree of the accelerator pedal is less than the reference opening degree, and the brake pedal is not operated.

As described above, according to an embodiment of the present disclosure, when it is determined that the controller controlling the operation of the AVH mode in the vehicle operating in the AVH mode has been reset, the vehicle is braked based on at least one of the gear position, the opening degree of the accelerator pedal, and whether the brake pedal is operated or not, thereby preventing the vehicle from rolling and preventing a collision with another vehicle.

Figure 3:
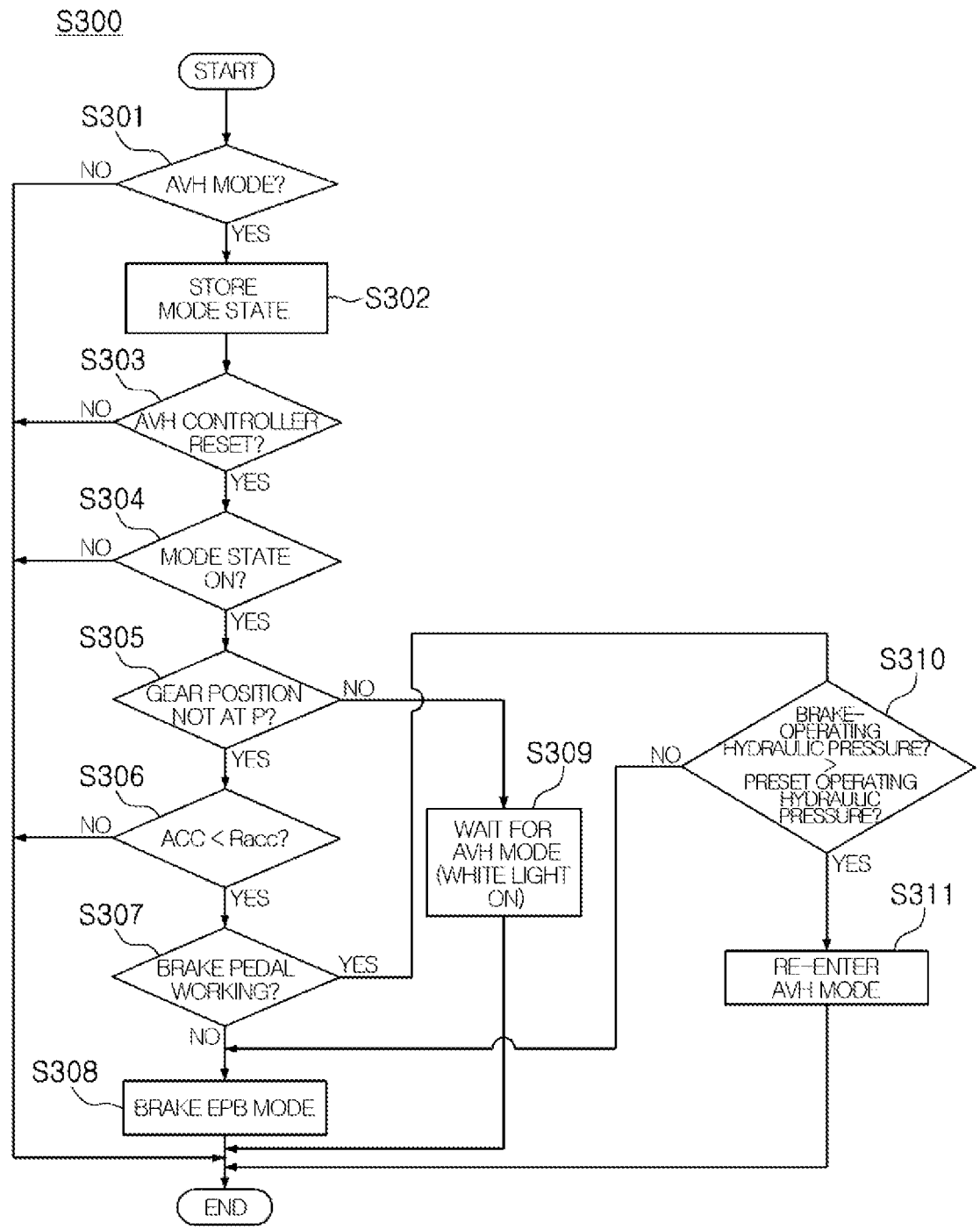
FIG. 3 is a flowchart illustrating a method of preventing rolling of a vehicle according to an embodiment.

FIG. 3 is a flowchart illustrating a method of preventing rolling of a vehicle operating in an automatic vehicle hold mode according to an embodiment.

Hereinafter, a rolling prevention method (S300) of a vehicle operating in an automatic vehicle hold mode according to an embodiment will be described with reference to FIGS. 1 to 3. However, for the sake of simplification of the descriptions, descriptions overlapping those of FIGS. 1 to 2C will be omitted.

First, referring to FIGS. 1 to 3, the rolling prevention method S300 of a vehicle operating in the automatic vehicle hold mode according to an embodiment may be initiated by determining whether the vehicle mode is the AVH mode (S301).

The AVH mode may be set by the driver operating an Automatic Vehicle Hold (AVH) switch of the vehicle, and when the AVH mode is set, various colors, for example, green may be lit to display the AVH mode.

For example, when the current mode of the vehicle is the AVH mode, the AVH controller 21 may store the mode state in the memory 124 (S302). As described above, the above-described mode state may be represented by 1 bit as on ('1') or off ('0').

Thereafter, the reset determination unit 121 may determine whether the AVH controller 21 that controls the AVH mode operation has been reset (S303). When it is determined that the AVH controller 21 has been reset, the process may proceed to operation S304. For reset determination, the reset determination unit 121 may monitor the voltage level of the power supplied to the AVH controller 21, and when a voltage drop of the power supplied to the AVH controller 21 occurs, the reset determination unit 121 may determine that the AVH controller 21 has been reset as described above.

Next, when it is determined that the AVH controller 21 has been reset, the mode determination unit 122 may determine whether the vehicle is in the AVH mode, for example, whether the mode state is ON (S304). When it is determined that the mode state is ON, the process may proceed to operation S305.

To this end, the apparatus for preventing rolling of a vehicle 120 may further include the memory 124 for storing a mode state indicating that the vehicle mode is the automatic vehicle hold mode. When it is determined that the AVH controller 21 has been reset, the mode determination unit 122 may determine whether the vehicle mode is the automatic vehicle hold mode with reference to the memory 124, as described above. The mode state is expressed by 1 bit as on ('1') or off ('0'), and the mode state may be written to the memory 124 by the AVH controller 21.

For example, when the vehicle mode is the AVH mode, the vehicle control unit 123 may brake the vehicle based on at least one of a gear position, an opening degree of an accelerator pedal, and whether a brake pedal is operated or not.

In detail, when the gear position is not in the P stage (S305), an accelerator pedal opening degree ACC is less than a reference opening degree Racc (S306), the brake pedal is operated (S307), and the operating hydraulic pressure according to the opening degree of the brake pedal is greater than the preset operating hydraulic pressure (S310); the vehicle control unit 123 may control the AVH controller 21 to re-enter the AVH mode, thereby braking the vehicle (S311).

On the other hand, when the gear position is not in the P stage (S305), the accelerator pedal opening degree ACC is less than the reference opening degree Racc (S306), and the brake pedal is not operated (S307), the vehicle control unit 123 may control the EPB controller 22, thereby braking the vehicle in the EPB mode.

On the other hand, since the vehicle control unit 123 is in a state in which the vehicle may be stopped by the transmission when the gear position is in the P stage, the AVH mode may be switched to the standby state (S309). In this case, for example, a white light may be turned on.

As described above, according to an embodiment, when it is determined that the controller controlling the operation of the automatic vehicle hold mode in the vehicle operating in the automatic vehicle hold mode has been reset, the vehicle is braked based on at least one of the gear position, the opening degree of the accelerator pedal, and whether the brake pedal is operated, thereby preventing the vehicle from rolling and thus preventing the vehicle from colliding with another vehicle.

Figure 4:
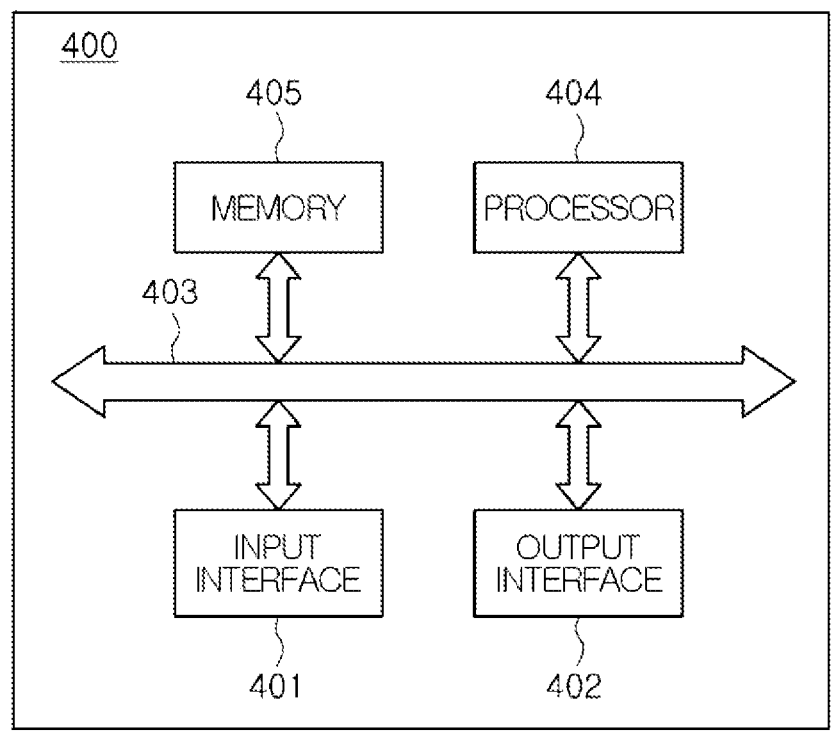
FIG. 4 is a block diagram of a computer device capable of implementing an apparatus for preventing rolling of a vehicle according to an embodiment.

On the other hand, FIG. 4 is a block diagram of a computer device capable of implementing the apparatus for preventing rolling of a vehicle according to an embodiment, and may be applied to the apparatus for preventing rolling of a vehicle 120 illustrated in FIG. 1.

As illustrated in FIG. 4, the apparatus for preventing rolling of a vehicle 120 may include an input interface 401, an output interface 402, a processor 404 and a memory 405, and the input interface 401, the output interface 402, the processor 404 and the memory 405 may be interconnected via a system bus 403.

In an embodiment, the memory 405 may be used to store a program, instruction or code, and the processor 404 may execute the program, instruction or code stored in the memory 405, receive signals by controlling the input interface 401, and transmit signals by controlling the output interface 402. The above-described memory 405 may include a read-only memory and a random access memory, and may provide instructions and data to the processor 404.

In an embodiment, the processor 404 may be a central processing unit (CPU), or may be other general-purpose processor, a digital signal processor (DSP), an application specific integrated circuit (ASIC), a Field Programmable Gate Array (FPGA) or other programmable logic device, discrete gate or transistor logic device, discrete hardware component, or the like. A general-purpose processor may be a microprocessor, or the processor may be any processor of the related art, or the like. The above-described processor 404 may perform the operation of the above-described apparatus for preventing rolling of a vehicle.

In one implementation process, the method of FIG. 3 may be implemented by an integrated logic circuit of hardware in the processor 404 or an instruction in the form of software. The content of the method disclosed in relation to the embodiment may be implemented to be performed and completed by a hardware processor, or may be performed and completed by a combination of hardware and software modules of the processor. The software module may be disposed in a storage medium such as random access memory, flash memory, read-only memory, programmable read-only memory or electrically erasable programmable memory, registers, and the like. The corresponding storage medium is located in the memory 405, and the processor 404 reads information from the memory 405 and implements the contents of the above-described method in combination with hardware. In order to avoid duplication, detailed descriptions are omitted herein.

As set forth above, according to an embodiment, when it is determined that the controller controlling the operation of the automatic vehicle hold mode in the vehicle operating in the automatic vehicle hold mode has been reset, by braking the vehicle based on at least one of a gear position, an opening degree of the accelerator pedal, and whether a brake pedal is operated, the vehicle may be prevented from rolling and from colliding with another vehicle.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for preventing rolling of a vehicle operating in an automatic vehicle hold mode, the apparatus comprising:
   one or more processors; and
   a memory storing a program to be executed by the one or more processors, the program including instructions to:
   determine whether an automatic hold controller controlling an operation of the automatic vehicle hold mode has been reset;
   determine whether a mode of the vehicle is the automatic vehicle hold mode when it is determined that the automatic hold controller has been reset; and
   brake the vehicle, based on at least one of a gear position, an opening degree of an accelerator pedal, and whether a brake pedal is operated, when it is determined that the mode of the vehicle is the automatic vehicle hold mode,
   wherein the program includes instructions to determine the reset based on a voltage drop of power supplied to the automatic hold controller when the vehicle is operating in the automatic vehicle hold mode.

2. The apparatus of claim 1, wherein the memory further stores a mode state indicating that the mode of the vehicle is the automatic vehicle hold mode,
   wherein when it is determined that the automatic hold controller has been reset, the program includes instructions to determine whether the mode of the vehicle is the automatic vehicle hold mode with reference to the memory.

3. The apparatus of claim 1, wherein the automatic hold controller is reset when an engine of the vehicle is started according to an idle stop and go mode when the vehicle is operating in the automatic vehicle hold mode.

4. The apparatus of claim 1, wherein, when the gear position is not at a parking state, the opening degree of the accelerator pedal is less than a reference opening degree, and the brake pedal is operated, and when an operating hydraulic pressure according to the opening degree of the brake pedal is greater than a preset operating hydraulic pressure, the program includes instructions to control the automatic hold controller, to re-enter the automatic vehicle hold mode, thereby braking the vehicle.

5. The apparatus of claim 1, wherein, when the gear position is not at a parking state, the opening degree of the accelerator pedal is less than a reference opening degree, and the brake pedal is not operated, the program includes instructions to control an electronic parking brake controller to brake the vehicle.

6. A method of preventing rolling of a vehicle operating in an automatic vehicle hold mode, the method comprising:
   a first operation of determining whether an automatic hold controller controlling an operation of the automatic vehicle hold mode has been reset;
   a second operation of determining whether a mode of the vehicle is the automatic vehicle hold mode when it is determined that the automatic hold controller has been reset; and
   a third operation of braking the vehicle based on at least one of a gear position, an opening degree of an accelerator pedal, and whether or not a brake pedal is operated, when it is determined that the mode of the vehicle is the automatic vehicle hold mode,
   wherein the first operation includes determining, a reset of the automatic hold controller based on a voltage drop of power supplied to the automatic hold controller when the vehicle is operating in the automatic vehicle hold mode.

7. The method of claim 6, further comprising storing, in a memory, a mode state indicating that the mode of the vehicle is the automatic vehicle hold mode,
   wherein in the second operation, when it is determined that the automatic hold controller has been reset, the second operation includes determining whether the mode of the vehicle is the automatic vehicle hold mode with reference to the memory.

8. The method of claim 6, wherein the automatic hold controller is reset when an engine of the vehicle is started according to an idle stop and go mode, when the vehicle is operating in the automatic vehicle hold mode.

9. The method of claim 6, wherein in the third operation, when the gear position is not at a parking state, the opening degree of the accelerator pedal is less than a reference opening degree, and the brake pedal is operated, and when an operating hydraulic pressure according to the opening degree of the brake pedal is greater than a preset operating hydraulic pressure, the third operation includes controlling, by the vehicle control unit, the automatic hold controller to re-enter the automatic vehicle hold mode, thereby braking the vehicle.

10. The method of claim 6, wherein in the third operation, when the gear position is not at a parking state, the opening degree of the accelerator pedal is less than a reference opening degree, and the brake pedal is not operated, the third operation includes controlling, by the vehicle control unit, an electronic parking brake controller to brake the vehicle.

11. A non-transitory computer-readable storage medium storing a program which causes a computer to:
   perform a first operation of determining whether an automatic hold controller controlling an operation of an automatic vehicle hold mode has been reset;
   a second operation of determining whether a mode of a vehicle is the automatic vehicle hold mode when it is determined that the automatic hold controller has been reset; and a third operation of braking the vehicle based on at least one of a gear position, an opening degree of an accelerator pedal, and whether or not a brake pedal is operated, when it is determined that the mode of the vehicle is the automatic vehicle hold mode,
wherein the first operation includes determining, a reset of the automatic hold controller based on a voltage drop of power supplied to the automatic hold controller when the vehicle is operating in the automatic vehicle hold mode.

* * * * *